United States Patent [19]

Zenner

[11] 4,023,180

[45] May 10, 1977

[54] DOT PRINTER WITH ELECTRICALLY PROPELLED INK

[76] Inventor: Walter J. Zenner, 10801 Highway E, Rte. 3, Mukwonago, Wis. 53149

[22] Filed: Jan. 12, 1976

[21] Appl. No.: 648,251

[52] U.S. Cl. .............................. 346/75; 346/140 R

[51] Int. Cl.[2] .............................. G01D 15/18

[58] Field of Search ......... 346/75, 140 R; 335/302, 335/306

[56] References Cited

UNITED STATES PATENTS

| | | | |
|---|---|---|---|
| 3,359,566 | 12/1967 | Donalies | 346/140 |
| 3,537,048 | 10/1970 | Spodig | 335/306 X |
| 3,836,913 | 9/1974 | Burnett et al. | 346/75 |

FOREIGN PATENTS OR APPLICATIONS

| | | | |
|---|---|---|---|
| 234,425 | 5/1925 | United Kingdom | 335/302 |

OTHER PUBLICATIONS

Greanias, E. C.; Hydraulic Electrostatic Printer, IBM Tech. Disc. Bulletin, vol. 13, No. 5, Oct. 1970, pp. 1131–1132.

Toupin, R. A. et al.; Magnetohydrodynamic Velocity Modulation of a Jet; IBM Tech. Disc. Bulletin, vol. 15, No. 4, Sept. 1972, pp. 1189–1190.

*Primary Examiner*—George H. Miller, Jr,
*Attorney, Agent, or Firm*—Kinzer, Plyer, Dorn & McEachran

[57] ABSTRACT

A print head for a column-sequential or row-sequential dot matrix printer which prints dots by electrically propelling droplets of ink onto a record comprising a manifold having an ink chamber communicating with a plurality of closely spaced generally parallel ink tubes; a pair of electrodes extends into each ink tube at diametrically opposed positions to provide a current path through electrically conductive ink in the tube and a magnetic field across the ends of the tubes causes a droplet of ink to be propelled outwardly from each tube whenever the electrodes for that tube are energized.

10 Claims, 7 Drawing Figures

Fig.1.
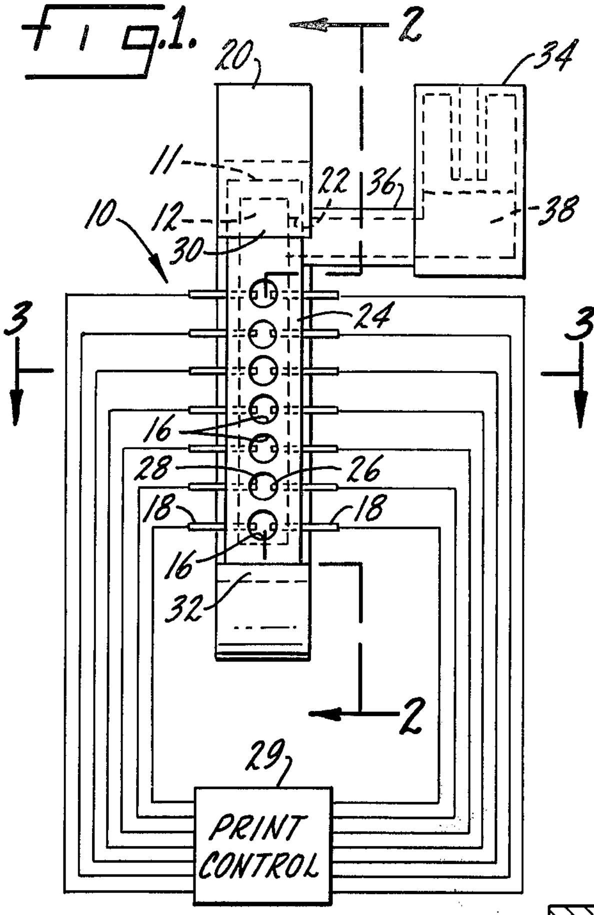
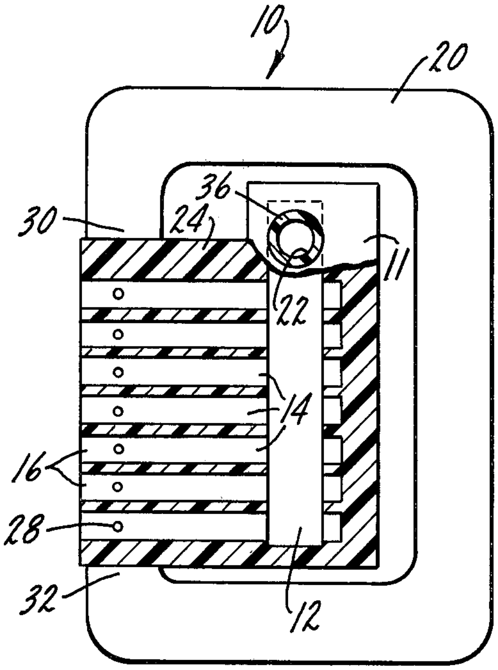
Fig.2.
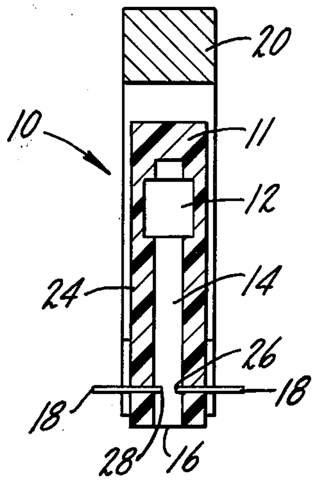
Fig.3.

Fig. 4.
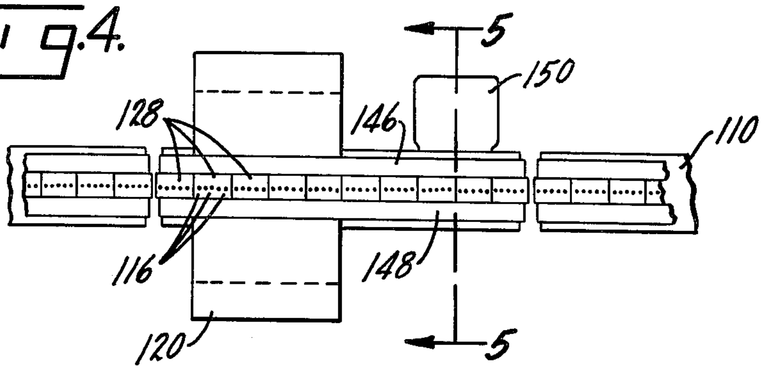
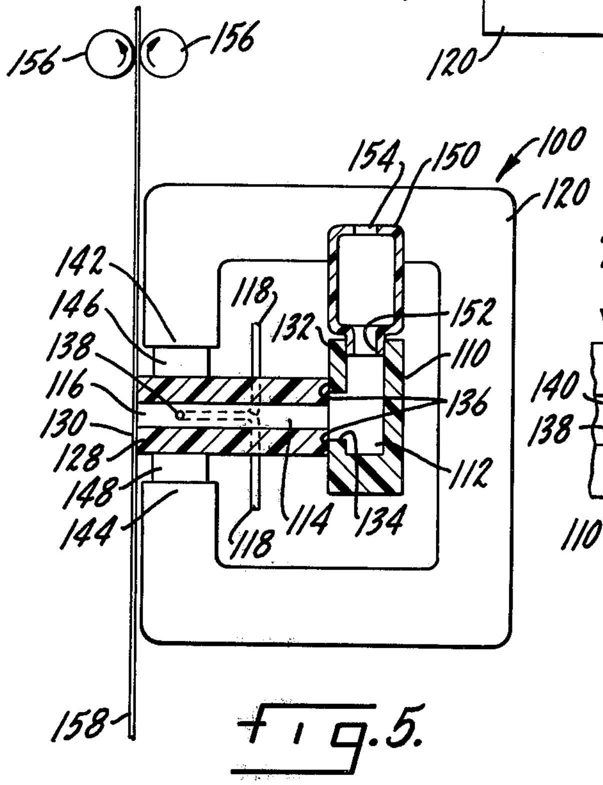
Fig. 5.
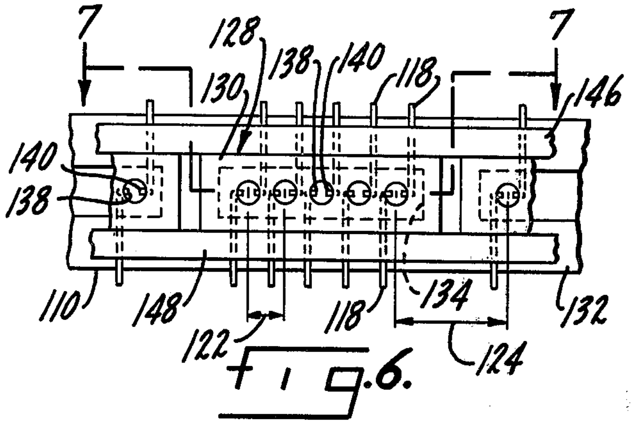
Fig. 6.
Fig. 7.
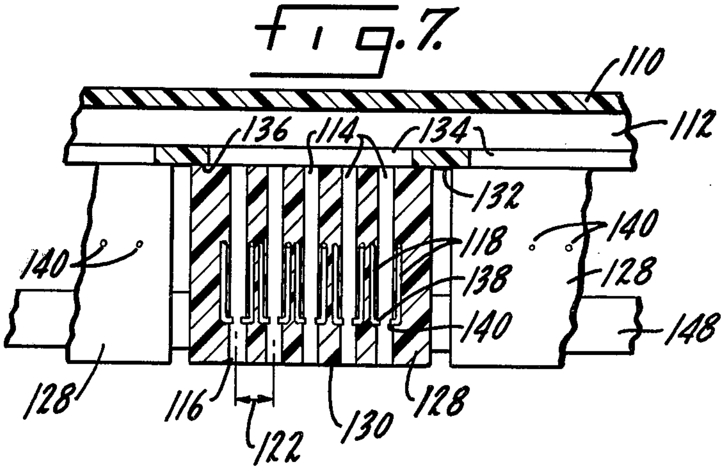

DOT PRINTER WITH ELECTRICALLY PROPELLED INK

BACKGROUND OF THE INVENTION

This invention relates in general to dot matrix printers, and more specifically to a print head for a dot matrix printer which prints dots by propelling droplets of electrically conductive ink onto a record.

Dot matrix printers generally have been known and used for many years. In one common form of dot matrix printer, a plurality of elongated print rods or wires are mounted on a print head carriage with their ends vertically aligned and juxtaposed to a record to be printed. To print a given character, the print rods are selectively driven against the record at a plurality of column positions, collectively forming a single character. In other known arrangements, two-dimensional or horizontal arrays of print rods may be provided. Similar thermal printing heads have also been employed.

A particularly limiting problem of known dot matrix printers, both in terms of speed and mechanical life, is the requisite mechanical movement associated with impact printing of the dots onto a record. Obviously, a print head may be reciprocated rapidly across a printed record when it is not printing. But practical printing speeds are considerably slower because the print rods must be repetitiously driven at and retracted from the printed record several times for each printed character. Although frictional losses associated with such movement may be minimized through improved lubricants and low friction mounting means, the inertia of the moving print rods and the moving parts of the driving electromagnets nevertheless remains a limiting factor in connection with print speed.

Related problems to the mechanical movement of the printing elements are the problems of wear and vibration. Although, as stated above, friction and the resultant wear of the moving parts may be minimized, it nevertheless remains a limiting factor. Furthermore, the necessity for precision machining of the moving parts results in increased expense to the dot matrix print head. Similarly, vibration may be alleviated by structurally reinforcing the print head and its support members, but this also adds to the expense of the resultant printer. Thus, an attendant disadvantage of dot matrix printers which have been devised heretofore to eliminate or minimize the above problems is the expense of both the materials and manufacture of the intricate mechanical assemblies comprising the print heads of such printers.

Furthermore, the operation of a typical dot matrix printer is attended by a constant chattering, producing considerable noise. Thus, any reduction in the movement of mechanical parts in the print head affords a bonus in terms of environmental noise. The noise factor is substantially reduced by use of a thermal print head, but at the cost of a requirement for use of expensive thermally responsive recording paper.

SUMMARY OF THE INVENTION

It is a principal object of the present invention, therefore, to provide a new and improved print head for a dot matrix printer in which mechanical movement of the printing elements relative to the print head is eliminated in the printing of a linear array of dots.

More specifically, it is an object of the invention to provide a new and improved print head for a dot matrix printer which accomplishes the printing of a linear array of dots (column or row) by utilizing the electromotive force incident to passing a current through a conductor in a magnetic field.

A further object of the invention is to provide a new and improved print head for a dot matrix printer in which the means for printing a plurality of groups of dots may be easily clustered in a simple mechanical structure, thereby enabling the practical and economical construction of a row-sequential dot matrix printer having a separate horizontally aligned printing means provided for each character of a line of print.

Another object of the present invention is to provide a new and improved print head for a dot matrix printer which makes possible a reduction of the noise attendant to operation of the same.

Another object of the present invention is to provide a new and improved print head for a column-sequential or row-sequential dot matrix printer which is simple and compact in construction, inexpensive to manufacture, and capable of long term use without mechanical failure.

Accordingly, the invention is directed to a print head for a column-sequential or row-sequential dot matrix printer which prints dots by electrically propelling droplets of electrically conductive ink onto a record. The print head includes a manifold which defines an internal ink chamber and a plurality of closely spaced parallel ink tubes having their inner ends in communication with the ink chamber and their outer ends terminating in a linear array of ink orifices. The ink tubes are of such diameter that they are large enough to be filled with electrically conductive ink yet small enough to restrain the free flow of ink therefrom. A corresponding plurality of electrode pairs each have end portions which extend into a respective one of the ink tubes at generally diametrically opposed positions adjacent the orifice end of each ink tube, thereby to provide a current path across the orifice through electrically conductive ink in the tube. Magnetic means create a uniform magnetic field across the orifices of all of the ink tubes. The direction of the magnetic field is generally perpendicular to both the inter-electrode current path across the ink tubes and the axes of the tubes, thereby to direct the electromotive force acting on the ink in the tubes outwardly toward a record sheet.

BRIEF DESCRIPTION OF THE DRAWINGS

FIG. 1 is a front elevation view illustrating a print head for a column-sequential dot matrix printer constructed in accordance with one embodiment of the present invention;

FIG. 2 is a sectional elevation view taken approximately along line 2—2 in FIG. 1;

FIG. 3 is a sectional view taken approximately along line 3—3 in FIG. 1;

FIG. 4 is a fragmented front elevation view of a print head for a row-sequential dot matrix printer constructed in accordance with another embodiment of the present invention;

FIG. 5 is a sectional view taken approximately as indicated by line 5—5 in FIG. 4, with paper and feed rolls included to illustrate their relationship to the print head during the printing operation;

FIG. 6 is an enlarged front elevation view of a portion of the print head of FIGS. 4 and 5; and FIG. 7 is a plan view, partly in cross-section, taken approximately as indicated by line 7—7 in FIG. 6.

DESCRIPTION OF THE PREFERRED EMBODIMENTS

A print head 10 for a column-sequential dot matrix printer is shown in FIGS. 1–3. The print head 10 includes a manifold 11 defining an internal ink chamber 12 and several ink tubes 14 communicating with the ink chamber. The ink tubes 14 terminate in a vertical array of ink orifices 16. Into each orifice extend a pair of electrodes 18, which are diammetrically opposed to form a transverse current path through electrically conductive ink in the tubes. The ends of the electrode pairs are aligned vertically between opposite poles of a magnet 20 which creates a magnetic field across the orifice ends of the ink tubes 14. Thus, as electric current is passed through the electrically conductive ink in the magnetic field of magnet 20, between any pair of electrodes 18, the resultant electromotive force propels a droplet of ink outwardly from the ink tube to form a dot on a record.

The manifold 11, shown in FIGS. 1–3, is an upstanding thin, flat housing enclosing an internal generally vertical ink chamber 12. The exact configuration of the manifold and internal chamber 12 is a matter of design choice: the chamber communicates with each of the ink tubes 14 to provide a continuous supply of ink to each. The manifold 11 may be provided with an inlet opening 22 through which ink is supplied to the chamber from an external ink reservoir.

The ink tubes 14, in the embodiment of FIGS. 1–3, are integrally formed in a thickened front wall 24 of the manifold 11. In other embodiments, the ink tubes 14 may be individual tubes protruding from the manifold 11 or they may be integrally molded into a separate ink tube cell which itself is secured to the manifold in such a way that ink is supplied to the ink tubes. In the integral construction shown, it may be advantageous to form the manifold of an electrically insulative material so as not to short-circuit the current paths between pairs of electrodes 18. On the other hand, the manifold may be constructed of any suitable material, and if the tubes are conductive, the electrodes 18 may be provided with suitable insulators.

The ink tubes 14 are arranged in a generally closely spaced parallel relationship to one another. The vertical spacing between the ink tubes 14, at least at the orifices 16, is determined by the generally uniform row spacing distance between the dot matrix positions of the characters to be printed. The tubes are preferably parallel in order to minimize the requisite size of the print head manifold 10 and also so that ink droplets propelled from the respective tubes are directed outwardly at the same angle toward the printed record. As stated above, the inner ends of the ink tubes 14 communicate with the ink chamber 12, receiving a continuous supply of ink therefrom. The diameters of the individual tubes are designed to provide a somewhat capillary action in that the tubes are wide enough to be filled with electrically conductive ink yet narrow enough to restrain the ink from flowing freely from the tube. The outer ends of the ink tubes terminate in a vertically oriented linear array of ink orifices 16 as shown best in FIG. 1. It is preferred that a sufficient number of orifices 16 be provided to print all of the dots of one incremental column of a print character. Each pair of electrodes 18 have terminal end portions 26 and 28 (FIG. 1) which may extend a short distance radially into a respective one of the ink tubes 14 at generally diametrically opposed positions adjacent the orifice 16 end of the tube. The terminal end portions 26 and 28 are spaced apart by a small distance. A current path between a respective pair of electrodes 18 is completed by the electrically conductive ink in the tube between the electrode ends 26 and 28. The electrodes 18 are connected to an appropriate print control circuit 29 for selective application of electrical ink-propulsion signals to the electrodes. Print control 29 may be essentially similar to the driver and control circuits used for the print rods of impact printers or the print elements of thermal printers, and hence is not shown in detail.

A magnetic field across the orifices 16 of the ink tubes 14 of the print head 10 is required. A permanent magnet 20 generally encircles the manifold 10 so that its poles 30 and 32 are aligned adjacent opposite sides of the array of ink tubes. In fact, in the embodiment shown, poles 30 and 32 of the permanent magnet 20 are engaged against the top and bottom surfaces of the manifold front wall 24. Thus, the end portions 26 and 28 of each pair of electrodes 18 are located between the ends 30 and 32 of the magnet directly within the magnetic field created by magnet 20. Thus, the magnetic field between the poles 30 and 32 is generally perpendicular to both the curent paths across the ink tubes and the axes of the tubes.

In order to maintain a supply of ink to the manifold chamber 12, which may be quite small, a separate ink reservoir 34 may be provided, together with passage means such as the tube 36 between the ink reservoir 34 and the ink inlet 22 of the ink chamber 12. The ink supply 38 within reservoir 34 may be slightly pressurized for delivery to the ink inlet 22 but need not be if the reservoir 34 is positioned horizontally adjacent or above the inlet so that gravity feed is permitted.

In operation, the column-sequential print head shown in FIGS. 1–3 may be mounted on the carriage of any one of several conventional dot matrix printers such as the Texas Instruments or National Cash Register thermal printers or the Singer or Extel impact printers. The carriage moves the print head laterally across the record once for each line of print. Each line is comprised of a multiplicity of column-sequential steps, each of which provides a vertical array of matrix positions at which dots may be printed in the formation of individual characters. The print head 10, shown in FIGS. 1–3, includes a vertical array of seven ink orifices 16, suitable for printing characters in a conventional 5 × 7 matrix. As the print head 10 is positioned at each column-sequential step, respective ones of the electrode pairs 18 may be momentarily energized to complete the current path through the electrically conductive ink in respective ones of the ink orifices 16 and propel a droplet of ink outwardly (to the left, in FIG. 2) onto a record. Thus, by printing selected dots at five successive column-sequential steps across the record, a single character is printed.

The principal by which the dot matrix printer of the present invention operates is quite simple. When an electric current passes through a conductor in a magnetic field, forces are generated which tend to move the conductor in a direction perpendicular to both the direction of the magnetic field and the current path. Therefore, as a given pair of electrodes 18 are momentarily energized, a current is established through the conductive ink, in the magnetic field of the permanent magent 20 across the orifice 16 of the respective ink tube. A force is generated which propels a droplet of ink outwardly onto the record to print a single dot in one of the matrix dot positions. This same printing action may occur in all or any of the ink tubes 14 at each column-sequential step across a record, thereby enabling the printing of a complete line of print.

Another embodiment of the present invention is shown in FIGS. 4–7. Here, the ink tubes are arranged to afford a print head 100 for a row-sequential dot matrix printer. The print head 100 includes a manifold 110 having an internal ink chamber 112 (FIG. 5), a plurality of ink tubes 114 communicating with the ink chamber 112 and terminating in a linear array of ink orifices 116. A corresponding plurality of electrode pairs 118 protrude into the ink tubes 114 and a magnet 120 with pole pieces 146 establishes a magnetic field across the orifices 116 of all of the tubes 114.

In the print head 100, the ink orifices 116 are oriented in a long horizontal row which includes a sufficient number of orifices to print dots at all of the column positions across a full line of characters. The ink orifices 116 of tubes 114 are arranged in spaced single-character clusters, as shown in FIG. 4, and in greater detail in FIG. 6. Each cluster or group includes a uniform number of tubes 114 which are spaced from one another by a uniform column spacing distance 122 (FIG. 6). The end tubes of adjacent clusters, on the other hand, are separated by a uniform character spacing distance 124.

The clusters of ink tubes 114 may be constructed in any desirable manner. Individual cylindrical ink tubes might protrude in parallel relation from an elongated manifold, but such tubes would be subject to bending and would otherwise form a quite delicate assembly. In the preferred embodiment, the ink tubes of each cluster are integrally formed in a single character cell 128 (FIGS. 6 and 7). Each cell 128 is a unit housing having several tubes formed therein, the axes of which are spaced apart by the column spacing distance 122. Each cell has a generally flat front surface 130 which presents a linear array of the ink orifices 116 corresponding to a particular character position.

To establish communication between each of the ink tubes 114 and the ink chamber 112 in manifold 110, the single character cells 128 may be formed as integral extensions protruding from the front face 132 (FIGS. 5 and 7) of the manifold 110. Similarly, a plurality of manifolds might be provided such that the ink chamber of each manifold would communicate with the ink tubes of at least one single-character cell 128. In the preferred embodiment, each single-character cell 128 engages a front wall 132 of the manifold 110 The front wall 132 is provided with at least one opening 134 through which communication is established between the ink tubes 114 of the cell 128 and the ink chamber 112. Thus, each cell 128 may constitute a separate integral structure engageable against the front wall 132 of the manifold and secureable thereon by any suitable means. For example, the cells may be generally permanently attached by applying adhesive along the engaged surfaces of the cell 128 and front wall 132, as at 136 in FIGS. 5 and 7. Otherwise, some mechanical fastening means may be provided to snap-fit the cells 128 against the manifold so that individual cells 128 may be removed for cleaning or replacement as necessary.

The cells 128 should be relatively rigid to maintain the horizontal alignment of the ink orifices 116. The cells must also be insulated from the conductive ink in the ink tubes 114 in order that inter-electrode current paths will be established through the ink rather than through the walls of the tubes 114. A rigid plastic material is preferred; metallic cells with suitable electrode insulators in the ink tubes 114 are also suitable.

To establish a current path through the electrically conductive ink in the tubes 114, a plurality of electrode pairs 118 are provided FIGS. 6 and 7) each pair of electrodes having end portions 138 and 140 which extend into a respective one of the ink tubes 114 at generally diametrically opposed positions adjacent the orifice end of the ink tube. Because of the small size of the single character cells 128 and the necessity of providing clearance for the magnetic means described below, it is preferred that the electrodes 118 be embedded in the walls of each cell 128 and carried rearwardly therein a short distance before exiting through the top or bottom of the cell for connection to the print control circuits (not shown).

Finally, in order to create the environment necessary to propel droplets of ink from the ink tubes 114, a magnetic field must be established across the orifice end of the ink tubes 114. The direction of the magnetic field is generally perpendicular to both the current path across the ink tubes and the axes of the tubes 114. Accordingly, a permanent magnet 120 is provided which has poles 142 and 144 (FIG. 5) positioned respectively above and below the ink tubes 114 at an axial position generally even with end portions 138 and 140 of the electrode pairs 118. Interposed between the ends 142 and 144 of magnet 120 and the cells 128 are a pair of elongated pole pieces 146 and 148 which are likewise situated above and below the horizontal array of orifices and in close proximity thereto. The pole pieces are likewise situated relative to the ink tubes at the same axial position as the electrode end portions 128 and 140.

An ink reservoir 150 (FIGS. 4 and 5) may be attached to the manifold 110 in order to maintain a sufficient quantity of ink in the internal chamber 112 of manifold 110 to supply all of the ink tubes 114 which communicate with the chamber 112. As shown in FIGS. 4 and 5, reservoir 150 may be an inverted bottle-like container connected to an opening 152 through the top of manifold 112. The reservoir 150 itself may be provided with a filler hole 154.

In operation, the print head 100 simultaneously prints all of the dots of one row-sequential step down a printed page. Print head 100 is preferably stationary during the printing operation, a record sheet 158 being advanced relative to the print head, rather than vice versa. Thus, in FIG. 5, feed rollers 156 rotate to advance the record sheet 158 upwardly by a predetermined row-spacing distance after the dots of each row step are printed. The row spacing distance is preferably equal to the column spacing distance 122 discussed above. In printing with a 5 × 7 matrix, for example, print head 100 prints one row of dots, then record 158 is raised by the row-spacing distance, after which another row of dots is printed, and so on until all seven row-sequential steps for a single line of print are recorded on the printed record. After the last or lowest row of dots of a line is printed, sheet 158 is advanced upwardly by a predetermined line spacing distance in order to separate the dots of adjacent lines of print.

The operation of an individual ink tube 114 of print head 100 in printing a single dot is the same as the operation of the ink tubes 14 in the embodiment of FIGS. 1–3. Briefly, electrically conductive ink from chamber 112 is introduced into ink tube 114 by gravity, fluid pressure or capillary action. An electrical signal pulse is applied to the electrode pair 118, causing a current to flow through the electrically conductive ink between the electrode ends 138 and 140. The ink at the orifice end of tube 114 thus experiences a force directed perpendicular both to the direction of the magnetic field and the current path. This direction is to the left in FIG. 5, onto the record sheet 158. The electrode pair 118 is energized only for a time sufficient to propel a small droplet of ink onto record sheet 158. As the ink in chamber 112 is thus slowly drained by the many tiny ink tubes 114, the rink supply in chamber 112 is continuously replenished from reservoir 150, maintaining a sufficient quantity of ink to supply all of the ink tubes 114.

The print control circuits for the row-sequential print head 100 may be similar to those used in the more conventional column-sequential printers, except with a greater number of matrix positions to be actuated simultaneously. For example, in the 5 × 7 matrix described above, instead of actuating seven matrix positions per incidence of printing, a larger number equal to some multiple of five matrix positions are actuated simultaneously to print all of the dots for one row-sequential step of a complete line of printed characters. Because a greater number of dots are printed per printing incidence, the overall printing operation may be accomplished quickly and quietly. However, the electrical controls must include provision for storing data representative of a complete line of printed characters. Since the row-sequential head 100 is stationary, the only required movement is that of the record sheet 158.

In the illustrated embodiments, permanent magnets (20 and 120) are employed. It will be recognized that suitable electromagnets can be used if preferred.

Thus, the invention affords a print head construction suited to either column-sequential or row-sequential dot matrix printing in which movement of the printing elements within the print head is eliminated, avoiding the attendant problems of noise, wear and vibration without requiring special thermal-sensitive paper. Since the dots of ink are propelled onto the record by electrical actuation, the mechanical structure of the print head is quite simple and permits economical construction of a row-sequential print head in which separate printing means for each matrix position are arranged side-by-side across an entire line of print. But regardless of whether the print head be constructed for a column-sequential or row-sequential dot matrix printer, its simple and economical construction makes it particularly suitable for long term use without mechanical failure.

I claim:

1. A print head, for a column-sequential or row-sequential dot matrix printer which prints dots by electrically propelling droplets of electrically conductive ink onto a record, comprising:

a manifold defining an ink chamber;

a plurality of closely spaced generally parallel ink tubes having their inner ends in communication with the ink chamber and their outer ends terminating in a linear array of ink orifices, each ink tube having a diameter large enough so that the tube may be filled with electrically conductive ink yet small enough to restrain the free flow of ink therefrom;

a corresponding plurality of electrode pairs, each pair of electrodes having end portions extending into a respective one of the ink tubes at generally diametrically opposed positions adjacent the orifice end of the ink tube to provide a current path across the orifice through electrically conductive ink in the tube; and magnetic means for creating a uniform magnetic field across the orifice ends of all of the ink tubes, the direction of the magnetic field being generally perpendicular to both the current paths across the ink tubes and the axes of the tubes, the magnetic means constituting a single magnet having its opposite poles located immediately adjacent the orifice array in positions such that the magnetic field of the one magnet extends through all of the orifices.

2. A print head for a dot matrix printer, according to claim 1, wherein the linear array of ink orifices is oriented in a vertical column and includes a sufficient number of such orifices to print all of the dots of one incremental column-sequential step for a single line of print, and the magnet poles are positioned at the opposite ends of the orifice array.

3. A print head for a dot matrix printer, according to claim 2, further comprising an ink reservoir and passage means between the ink reservoir and ink chamber to maintain a sufficient quantity of ink in the chamber to supply all of the ink tubes communicating therewith.

4. A print head for a dot matrix printer, according to claim 1, wherein the linear array of ink orifices is oriented in a horizontal row, there being a sufficient number of such orifices across the print head to print all of the dots of one incremental row-sequential step down the records, and the magnet having pole pieces which extend along the top and bottom of the orifice row throughout its length.

5. A print head for a dot matrix printer, according to claim 4, wherein the ink tubes are arranged in spaced single-character clusters, each cluster including a uniform number of tubes spaced by a uniform column spacing distance, and end tubes of adjacent clusters being spaced by a uniform character spacing distance.

6. A print head for a dot matrix printer, according to claim 5, wherein the ink tubes of each cluster are integrally formed in a single character cell.

7. A print head for a dot matrix printer, according to claim 6, wherein each single character cell is an integral extension of the manifold.

8. A print head for a dot matrix printer, according to claim 6, further comprising a plurality of manifolds, the ink chamber of each manifold communicating with the ink tubes of at least one single character cell.

9. A print head for a dot matrix printer, according to claim 6, wherein each single character cell engages a front wall of the manifold, which front wall is provided with at least one opening through which communication is established between the ink tubes of a single character cell and the ink chamber.

10. A print head for a dot matrix printer, according to claim 9, further comprising an ink reservoir and passage means between the ink reservoir and ink chamber to maintain a sufficient quantity of ink in the chamber to supply all of the ink tubes communicating therewith.

* * * * *